(12) United States Patent
Peek, Jr.

(10) Patent No.: US 9,739,051 B2
(45) Date of Patent: Aug. 22, 2017

(54) METHOD TO METER A THERMAL BARRIER UPON A SURFACE

(71) Applicant: Donald Leo Peek, Jr., Texarkana, TX (US)

(72) Inventor: Donald Leo Peek, Jr., Texarkana, TX (US)

( * ) Notice: Subject to any disclaimer, the term of this patent is extended or adjusted under 35 U.S.C. 154(b) by 0 days.

(21) Appl. No.: 14/085,279

(22) Filed: Nov. 20, 2013

(65) Prior Publication Data

US 2014/0072707 A1    Mar. 13, 2014

Related U.S. Application Data

(63) Continuation-in-part of application No. 12/459,305, filed on Jun. 30, 2009, now abandoned.

(51) Int. Cl.
| E04B 1/76 | (2006.01) |
|---|---|
| E04F 21/12 | (2006.01) |
| E04D 13/16 | (2006.01) |

(52) U.S. Cl.
CPC ............ *E04B 1/76* (2013.01); *E04D 13/1668* (2013.01); *E04F 21/12* (2013.01); *E04B 2001/7691* (2013.01); *Y02B 30/94* (2013.01)

(58) Field of Classification Search
CPC ........ E04B 1/7604; E04B 1/6801; E04B 1/62; E04F 21/085; B05B 7/1409; B05B 7/1404; B05B 7/1413; B05B 7/144; B05B 7/145; B05B 7/1486; B01F 15/0235
USPC ...................... 52/742.13, 404.1, 407.1, 407.3
See application file for complete search history.

(56) References Cited

U.S. PATENT DOCUMENTS

| | | | | |
|---|---|---|---|---|
| 4,249,839 | A * | 2/1981 | Vance | B65G 53/4658 406/109 |
| 4,776,142 | A * | 10/1988 | Hardesty | B32B 15/14 428/328 |
| 4,835,831 | A * | 6/1989 | Melton | 29/460 |
| 5,033,248 | A * | 7/1991 | Phillips | 52/742.14 |
| 5,365,716 | A * | 11/1994 | Munson | 52/742.13 |
| 5,367,849 | A * | 11/1994 | Bullock | E04B 9/001 52/409 |
| 6,047,518 | A * | 4/2000 | Lytle | 52/742.13 |
| 6,584,749 | B2 * | 7/2003 | Sperber | 52/742.1 |
| 7,125,204 | B2 * | 10/2006 | Wysong | 406/38 |
| 2006/0162649 | A1 * | 7/2006 | Fellinger | 118/300 |
| 2007/0292218 | A1 * | 12/2007 | Suchey | 406/14 |
| 2008/0020206 | A1 * | 1/2008 | Fay | 428/375 |
| 2008/0142380 | A1 * | 6/2008 | Unruh et al. | 206/170 |
| 2009/0004459 | A1 * | 1/2009 | Kipp et al. | 428/318.4 |
| 2011/0138724 | A1 * | 6/2011 | Olang | 52/309.4 |

* cited by examiner

*Primary Examiner* — Brian Glessner
*Assistant Examiner* — Omar Hijaz
(74) *Attorney, Agent, or Firm* — Greer, Burns & Crain, LTD; Roger L. Maxwell, P.C.

(57) ABSTRACT

A manner by which to form a thermal barrier upon a surface, utilizes a pneumatic blower to form a layer of thermal insulation material and a layer of radiant barrier material. The pneumatic blower is first charged with the thermal insulation material, and the thermal insulation material is metered upon the surface. Then, the pneumatic blower is charged with the radiant barrier material, and the radiant barrier material is metered upon the thermal insulation material.

24 Claims, 7 Drawing Sheets

AN INSULATION SYSTEM

| A layer of insulation having a top surface | — 702 |

| A layer of pieces of material resting on the top surface | — 704 |

FIG. 7

A RADIANT BARRIER

| Pieces of aluminum foil that are deposited on insulation with blown air | — 802 |

METHOD TO METER A THERMAL BARRIER UPON A SURFACE

CROSS-REFERENCE TO RELATED APPLICATIONS

The present application is a continuation-in-part of application Ser. No. 12/459,305 filed on 30 Jun. 2009, the content of which is incorporated herein in its entirety.

FIELD

The present disclosure is generally related to methods to add a radiant barrier to insulation and the products thereof.

DESCRIPTION OF RELATED ART

Radiant barriers are commonly installed in residential, commercial, and industrial buildings to reduce summer heat gain and winter heat loss, and hence to reduce building cooling and heating energy usage.

Radiant barriers can reduce heat transfer by thermal radiation across the air space between the roof deck and the attic floor, where conventional insulation is often placed. All materials give off, or emit, energy by thermal radiation as a result of their temperature. The amount of energy emitted depends on the surface temperature and a property called the "emissivity." The emissivity is a number between zero (0) and one (1). The higher the emissivity, the greater the emitted radiation.

A closely related material property is the "reflectivity." Reflectivity is a measure of how much radiant heat is reflected by a material. The reflectivity is also a number between 0 and 1. For a material that does not allow radiation to pass directly though it, when the emissivity and reflectivity are added together, the sum is one (1). Hence, a material with a high reflectivity has a low emissivity, and vice versa. Radiant barrier materials generally have a high reflectivity (usually 0.9 or more) and a low emissivity (usually 0.1 or less) and face an open air space to perform properly.

On a sunny day, solar energy is absorbed by the roof, heating the roof sheathing and causing the underside of the sheathing and the roof framing to radiate heat downward toward the attic floor. When a radiant barrier is placed on the attic floor, much of the heat radiated from the hot roof is reflected back toward the roof. This makes the top surface of the insulation cooler than it would have been without a radiant barrier, and heat flow through the insulation is reduced. On a winter day, when a radiant barrier is installed on the attic floor, it emits little heat, keeping the insulation warmer than it would have been without a radiant barrier, and, again, heat flow through the insulation is reduced.

Heretofore, some radiant barriers have been formed with reinforced aluminum sheets. It takes extensive time and labor to install such sheets properly. Also, some radiant barriers are formed of heavy gauge material or of material that is reinforced in the manufacturing process to hold individually manually attached fasteners and to avoid tearing. Many times, the materials used to reinforce the aluminum sheet are combustible. The prior process of manually installing single layers of sheet materials often allows for degradation of its reflective properties over time due to dust settling on the flat surface and dulling its reflectivity. It also must be removed to even enter the attic space or to conduct repairs of any of the various mechanical and electrical systems typically contained in attic spaces and must be properly reattached after any exit.

Hence, prior art radiant barriers have the shortcomings and deficiencies of high cost, difficult installation requirements, combustibility, subject to degradation caused by dust, and difficulty doing repairs when it is installed.

SUMMARY

In a particular embodiment, a method to add a radiant barrier to existing thermal insulation includes collecting processed pieces of material, and pneumatically metering the processed pieces of material to add a radiant barrier to the existing thermal insulation.

In another particular embodiment, a method to add a radiant barrier to insulation having a top surface includes collecting a material that reflects more than the insulation, and applying the material to the top of the insulation with blown air.

In another particular embodiment, a method to add a radiant barrier to an insulation system includes collecting radiant barrier material, and applying the radiant barrier material to the insulation system pneumatically.

In another particular embodiment, a method to add a radiant barrier to an insulation system having a top surface includes collecting radiant barrier material, and applying the radiant barrier material to the top of the insulation system pneumatically.

In another particular embodiment, an insulation system includes a layer of insulation having a top surface, and a layer of pieces of material laying on the top surface.

In another particular embodiment a radiant barrier including pieces of aluminum foil that are deposited on insulation material with blown air.

One particular advantage provided by embodiments of the method to add a radiant barrier to insulation is that extensive time and labor to install it is not required. A particular advantage provided by embodiments of the product of the method to add a radiant barrier to insulation is that it is not combustible. Another particular advantage provided by embodiments of the product of the method to add a radiant barrier to insulation is that its reflective properties do not degrade over time due to dust settling on the flat surface and dulling its reflectivity. Another particular advantage provided by embodiments of the product of the method to add a radiant barrier to insulation is that one does not need to remove it to enter the attic space or to conduct repairs of any of the various mechanical and electrical systems typically contained in attic spaces, nor does one need to reattach it upon exit.

Other aspects, advantages, and features of the present disclosure will become apparent after review of the entire application, including the following sections: Brief Description of the Drawings, Detailed Description, and the Claims.

DETAILED DESCRIPTION

Figure 1A:
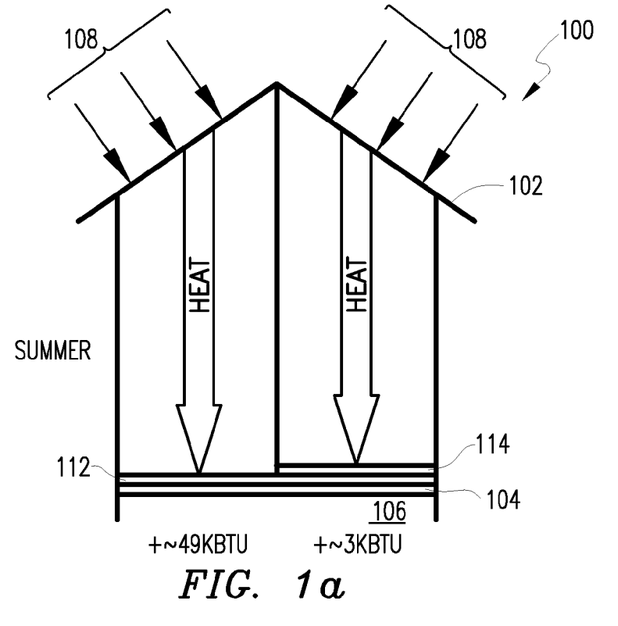
FIG. 1a is a block diagram of a particular illustrative embodiment of a product of a method to apply a radiant barrier to existing thermal insulation that shows its reflectivity ability.
Figure 1B:
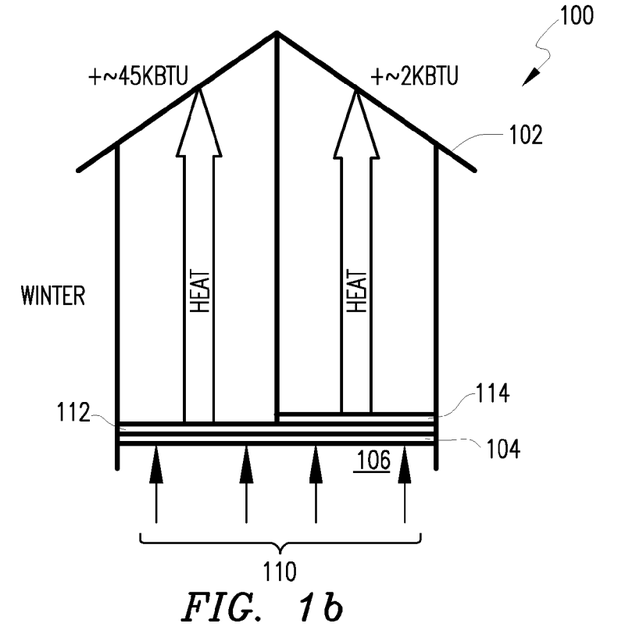
FIG. 1b is a block diagram of a particular illustrative embodiment of a product of a method to apply a radiant barrier to existing thermal insulation that shows its emissivity ability.

Referring to FIGS. 1a and 1b, block diagrams of a particular illustrative embodiment of the area in which a product of a method to apply a radiant barrier to existing thermal insulation can be found is disclosed and generally designated 100. Area 100 is the attic of a house or building with an attic roof 102 and an attic floor 104. Beneath the attic floor 104 is the living/working area 106 of the building or house. FIG. 1a illustrates a situation in which it is designed to keep area 106 cool—a typical summer situation, as labeled in the figure. FIG. 1b illustrates a situation in which it is desired to keep area 106 warm—a typical winter situation, as labeled in the figure. In FIG. 1a—the typical summer situation—rays from the sun 108 are shown striking attic roof 102. The rays from the sun 108 cause heat (shown by labeled arrows) to be transferred from the attic roof 102 towards the attic floor 104. In FIG. 1b, rays of heat 110 from area 106 are shown striking attic floor 104. The rays of heat 110 cause heat (shown by labeled arrows) to be transferred from the attic floor 104 towards the attic roof 102.

In both FIGS. 1a and 1b on the attic floor is existing insulation 112. On the left halves of FIGS. 1a and 1b, there is nothing on the top surface of the existing insulation 112 (that is, on the surface of the insulation 112 facing the open space between the attic floor 104 and the attic roof 102). On the right halves of FIGS. 1a and 1b, a radiant barrier 114 is shown laying on the top surface of the insulation 112.

FIG. 1a shows that heat from the rays from the sun 108 cause a transfer of approximately 49K British thermal units or BTUs (a term commonly used to indicate heat value) to the attic floor 104 when no radiant barrier 114 is present and transfer of only about 3 BTUs when a radiant barrier 114 is present (actual values depend on a number of measurements, such as the temperature of the attic floor 104, the temperature of the attic roof 102, etc.). This is because the radiant barrier 114 reflects a significant amount of heat that strikes the top surface of the existing insulation 112. This means that the existing insulation 112 will have less heat to deal with, and that the living or working area 106 is cooler if a radiant barrier 114 is present.

FIG. 1b shows that heat from rays 110 cause a transfer of approximately 45K BTUs to the attic roof 102 when no radiant barrier 114 is present and transfer of only about 2K BTUs when a radiant barrier 114 is present. This is because the radiant barrier 114 emits very little heat from its top surface. This means that more heat is retained in area 106, which is desired in a winter situation.

Together, FIGS. 1a and 1b show that a radiant barrier 114 can effectively keep a living or working area 106 cooler in the summer by keeping heat out and warmer in the winter by keeping heat in, which can lead to significant reduction in energy usage, and, therefore, significant cost savings.

Figure 2:
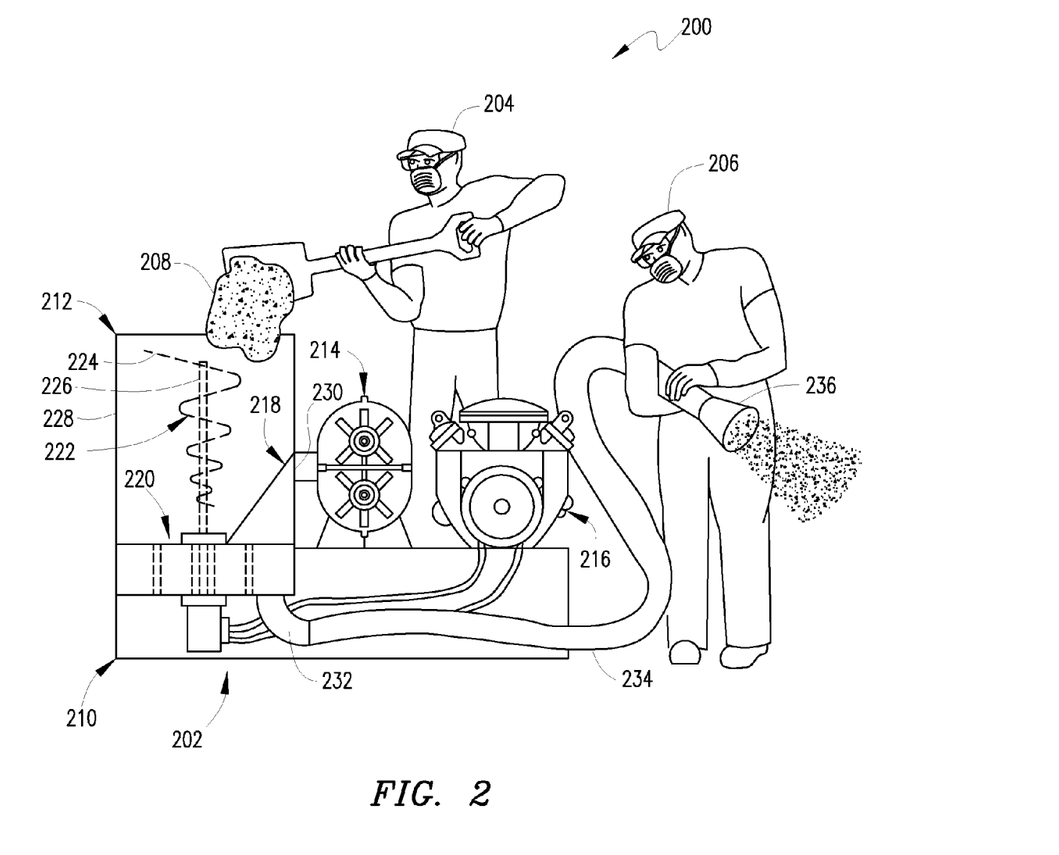
FIG. 2 is an operational view of a method to add a radiant barrier to existing insulation.

Referring to FIG. 2, a method to add a radiant barrier to existing insulation is shown and generally designated 200. Method 200 involves a portable pneumatic blower 202 that can be operated by two workers 204 and 206.

Worker 204 places material 208 in the pneumatic blower 202. Material 208 can be processed material. Material 208 can be processed pieces of material comprising low emissivity (low-e) material. Material 208 can be processed pieces of material comprising bits of aluminum foil. Material 208 can be a material that reflects more than conventional insulation. Material 208 can be material that reflects more and emits less than conventional insulation. Material 208 can comprise foil material. Material 208 can comprise aluminum foil. Material 208 can comprise loose bits and pieces of aluminum foil.

Pneumatic blower 202 includes a base 210. Base 210 supports a hopper 212, a blower 214 and an engine 216.

Hopper 212 includes an airlock 218, a feeder 220 and an auger 222. Auger 222 includes a spiral blade 224 and auger shaft 226 housed in a shell 228. Blade 224 is configured to drive material 208 towards feeder 220 when the shaft 226 is driven in a predetermined direction by engine 216.

The shell 228 defines an opening 230 that enables air from blower 214 to enter hopper 212. Airlock or air chamber 218 separates the material 208 from the air entering through opening 230 and channels the air downwardly towards feeder 220.

Material 208 is gravity fed into feeder 220. The feeder 220 conveys the material 208 underneath the air chamber 218, wherein the pressurized air in the chamber 218 forces the material 208 in the feeder 220 to exit therefrom via an outlet 232 into a flexible hose 234. The person 206 holds a distal end 236 of the hose 234 to control the placement of material that flows from the hose 234 while the blower 214 runs. The material that flows from the distal end 236 of the hose 234 is pneumatically metered material 208—e.g., air blown loose bits and pieces of a low-e material such as aluminum foil.

Alternatives are possible. For example, the pneumatic blower 202 can be assembled in different configurations and/or with various different components as described in U.S. Pat. No. 7,125,204, the contents of which are incorporated herein by this reference thereto. The pneumatic blower 202 can be any size, such as truck mounted or portable and/or handheld. Ideally, the pneumatic blower is relatively small so as to be easily positioned in a conventional attic where it can be used to pneumatically meter material 208. A single worker can both load material 208 into the blower 202 and operate the blower 202. The material can be in any form for convenient handling, such as in a bag containing loose bits and pieces of aluminum foil fed directly into a blower. Method 200 is an illustrative method to pneumatically deposit radiant barrier material on the top surface of existing insulation in an attic.

Figure 3:
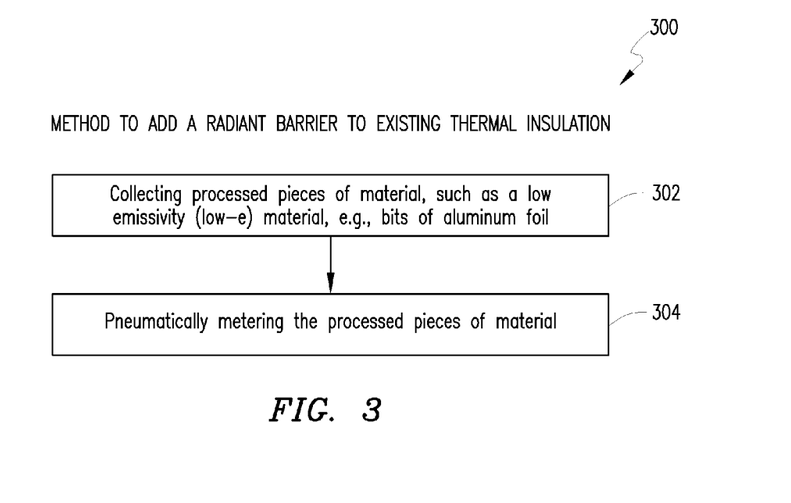
FIG. 3 is a flow chart of a particular illustrative embodiment of a method to add a radiant barrier to insulation.

Referring to FIG. 3, a flow chart of a method to add a radiant barrier to existing thermal insulation is shown and generally designated 300. At step 302, one collects processed pieces of material, such as a low emissivity (low-e) material (e.g., bits of aluminum foil). At step 302, one pneumatically meters the processed pieces of material.

Figure 4:
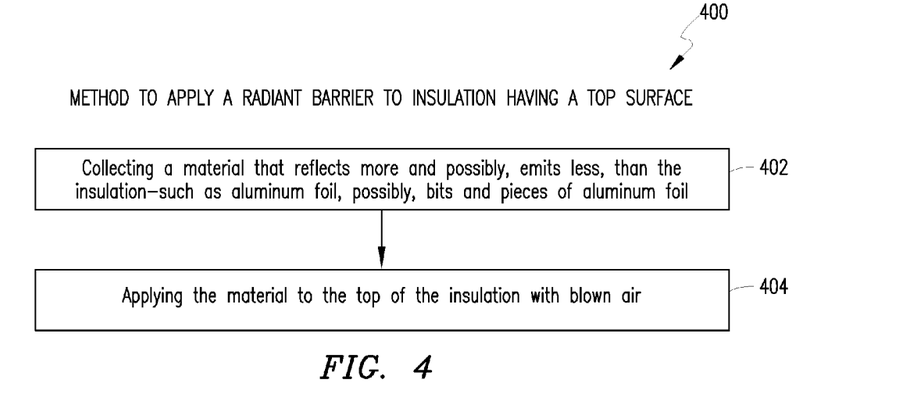
FIG. 4 is a flow chart of a particular illustrative embodiment of a method to add a radiant barrier to insulation.

Referring to FIG. 4, a flow chart of a method to add a radiant barrier to insulation having a top surface is shown and generally designated 400. At step 402, one collects a material that reflects more and possibly, emits less, than the insulation. This material could be aluminum foil, and possibly, loose bits and pieces of aluminum foil. At step 404, one applies the material to the top of the insulation with blown air.

Figure 5:
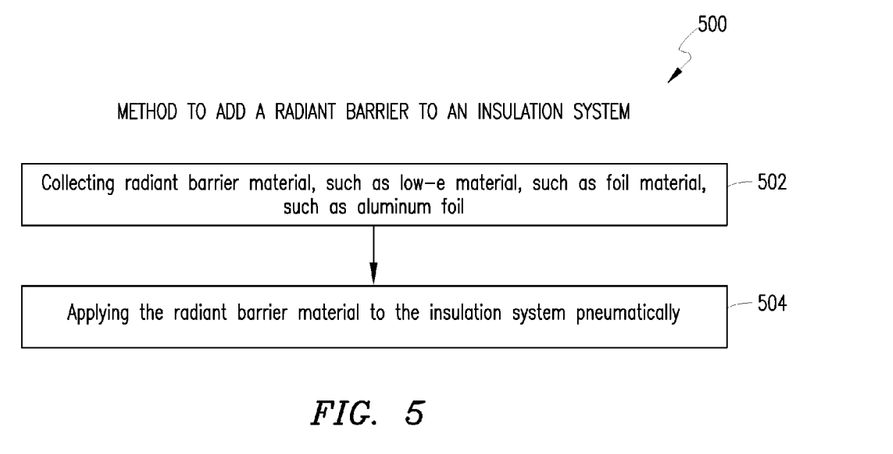
FIG. 5 is a flow chart of a particular illustrative embodiment of a method to add a radiant barrier to insulation.

Referring to FIG. 5, a flow chart of a method to add a radiant barrier to an insulation system is shown and generally designated 500. At step 502, one collects radiant barrier material, such as low-e material, such as foil material, such as aluminum foil. At step 504, one applies the radiant barrier material to the insulation system pneumatically.

Figure 6:
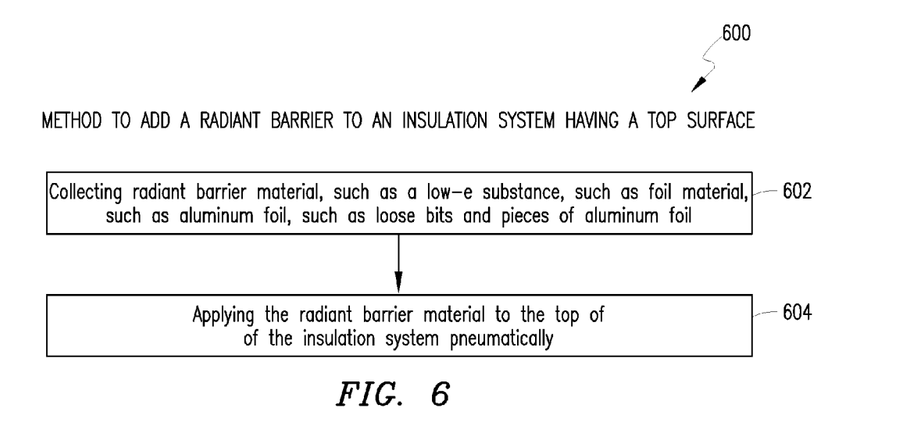
FIG. 6 is a flow chart of a particular illustrative embodiment of a method to add a radiant barrier to insulation.

Referring to FIG. 6, a flow chart of a method to add a radiant barrier to an insulation system having a top surface is shown and generally designated 600. At step 602, one collects radiant barrier material, such as low-e substance, such as foil material, such as aluminum foil, such as loose bits and pieces of aluminum foil. At step 604, one applies the radiant barrier material to the top of the insulation system pneumatically.

Figure 7:
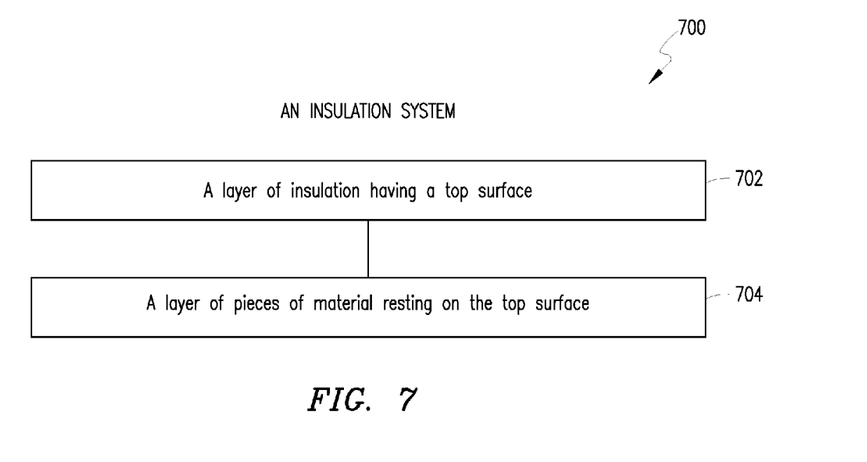
FIG. 7 is a block diagram of a particular illustrative embodiment of a product of a method to add a radiant barrier to insulation.

Referring to FIG. 7, a block diagram of a particular illustrative embodiment of an insulation system is depicted and designated system 700. System 700 is formed by elements 702 and 704. Element 702 is a layer of insulation having a top surface. Element 704 is a layer of pieces of material resting on the top surface—that is, material spread by the method of the present invention.

Figure 8:
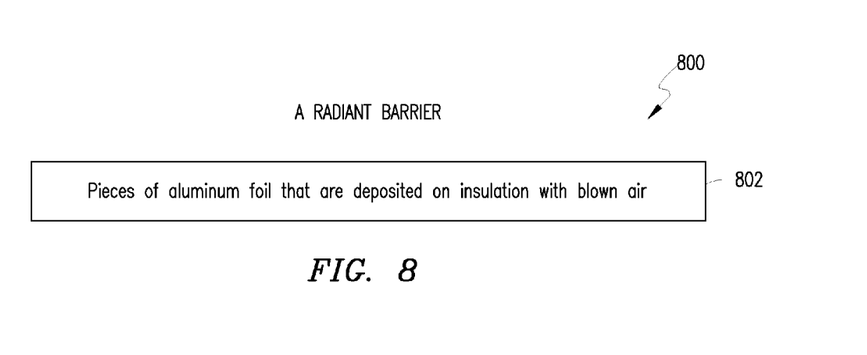
FIG. 8 is a block diagram of a particular illustrative embodiment of a product of a method to add a radiant barrier to insulation.

Referring to FIG. 8, a block diagram of a particular illustrative embodiment of a radiant barrier is depicted and designated system 800. Radiant barrier 700 is formed of pieces of aluminum foil that are deposited on insulation with blown air 702.

Figure 9:
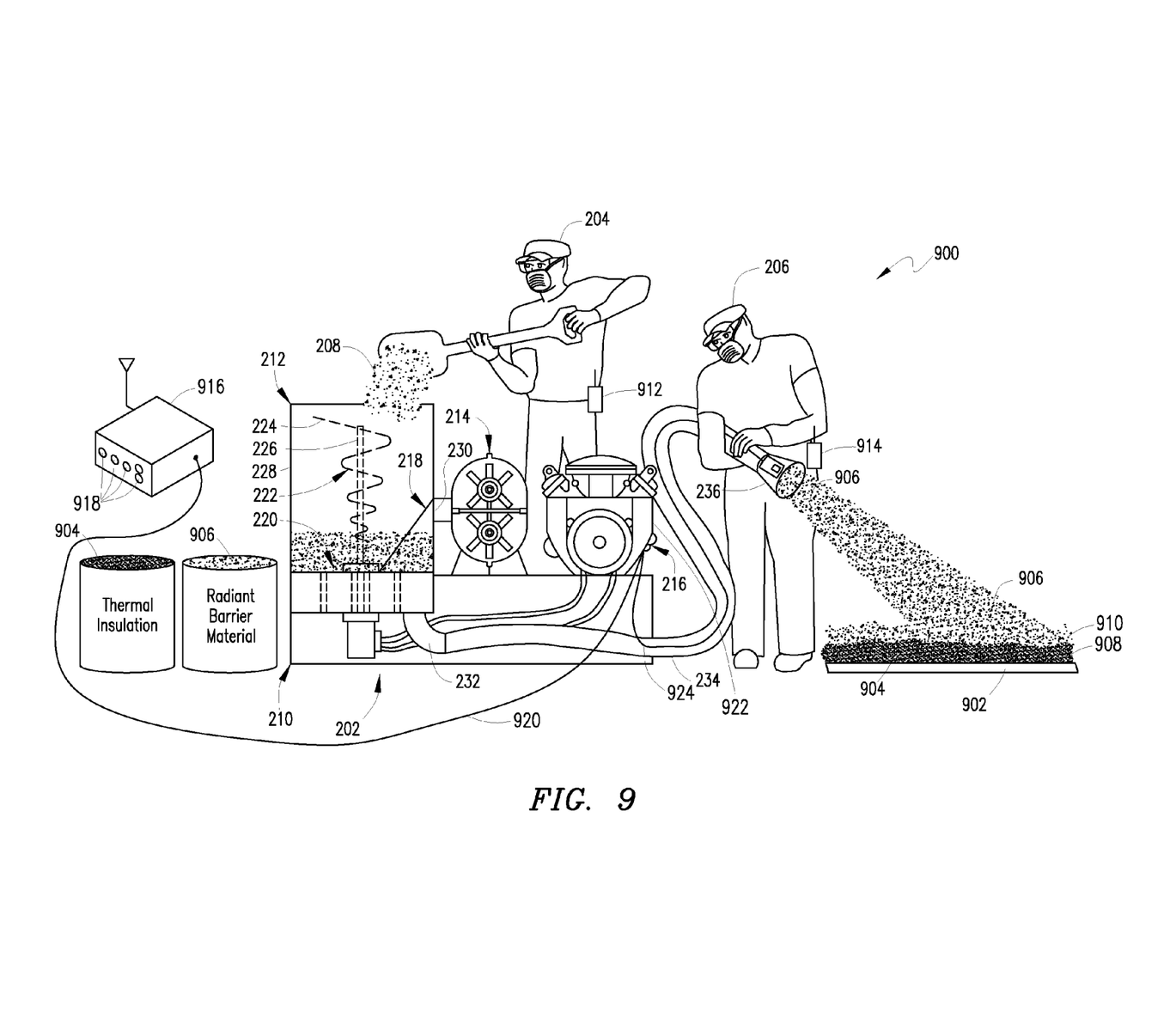
FIG. 9 is an operational view of a manner by which to apply both thermal insulation and a radiant barrier to a surface.
Figure 10:
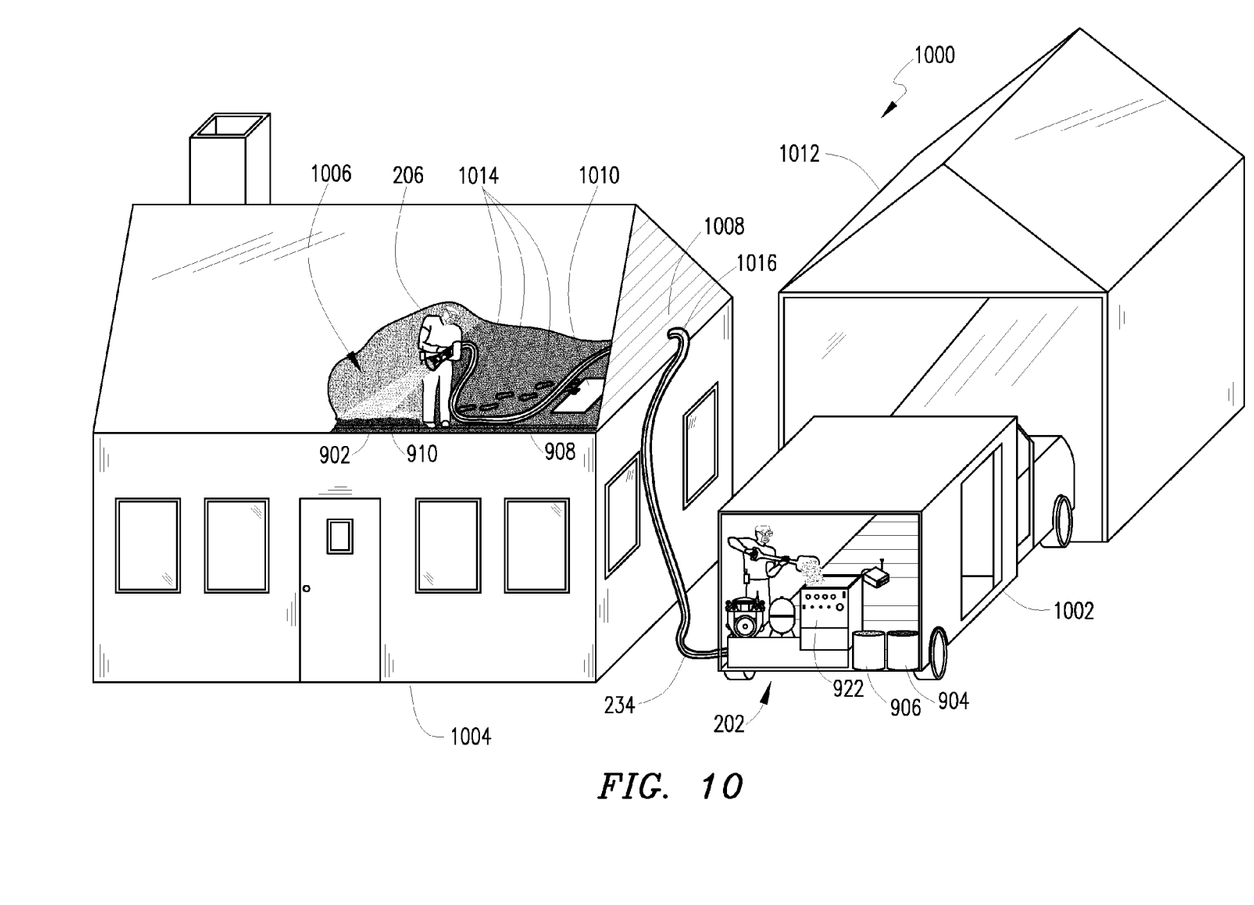
FIG. 10 is an operational view of a manner, including a communication mechanism, by which to apply both thermal insulation and a radiant barrier to a surface in an attic.

FIGS. 9 and 10 illustrate more detailed implementations, shown generally as 900 and 1000, of embodiments of the present invention. The implementations 900 and 1000 pertain both to methods and to apparatuses that carry out the methods. The implementations 900 and 1000 are analogous to the method 200 shown in FIG. 2, and structure previously shown and described with respect to the implementation of FIG. 2 is commonly referenced in FIGS. 9 and 10 with common reference numerals. The implementation 900 provides for the installation of a thermal barrier upon a surface in which the thermal barrier comprises both a layer of thermal insulation and a layer of a radiant barrier material and the implementation 1000 provides for the installation of a thermal barrier upon a surface in an attic including a communication mechanism between separated workers and where thermal insulation is applied partially, for repair, and radiant barrier material is applied completely, for a full new application.

Accordingly, in FIG. 9 the implementation 900 is again shown to include a pneumatic blower 202 that, in the exemplary implementation, is operated by a pair of workers, a worker 204 and worker 206. The worker 204 charges material 208 into the pneumatic blower 202. The worker 204 may charge the pneumatic blower 202 with thermal insulation 904 and/or he may charge the blower 202 with radiant barrier material 906. The worker 206 manipulates the distal end 236 of the flexible hose 234 to apply either charged material 904 or charged material 906. One worker may practice implementation 900 by performing the work done by both workers 204 and 206.

The pneumatic blower 202 here also includes a base 210 that supports a hopper 212, a blower 214, and an engine 216. The hopper 212 includes an airlock 218, a feeder 220, and an auger 222. The auger 222 includes a spiral blade 224 and an auger shaft 226, which are housed within a shell 228. The worker 204 towards the feeder 220 configures the blade 224 to drive the material 208 that is charged into the blower when the engine 216 drives the auger shaft 226. The shell 228 defines an opening 230. The opening 230 enables air generated during operation of the blower 214 to enter into the hopper 212. The airlock is positioned to cause separation of the material 208 from the airflow entering the blower 214 by way of the opening 230 and further functions to channel the airflow downwardly towards the feeder 220.

When the worker 204 charges the material 208 into the pneumatic blower, the force of gravity causes the material to fall into the feeder 220. The feeder conveys the material 208 underneath the air chamber 218, and the pressurized air in the chamber 218 forces the material 208 in the feeder 220 to exit the feeder by way of an outlet 232 to which the flexible hose 234 is attached. The worker 206 holds or otherwise supports the flexible hose 234 and the positioning of the distal end 236 of the hose. The worker 206 thereby controls the direction of the flow of the material that is pneumatically metered during operation.

In the exemplary implementation 900, a thermal barrier is installed upon a base 902, such as an attic floor or other substrate. The thermal barrier is formed of a thermal insulation layer with a radiant barrier layer there above.

In a method of operation of the implementation 900, the worker 204 first charges the pneumatic blower with the thermal insulation material 904. The thermal insulation material is formed, e.g., of segregable pieces of insulation that are of sizes permitting pneumatic metering when the pneumatic blower 202 is operated. The metering of the thermal insulation 904 causes formation of the thermal insulation layer 908, formed of the thermal insulation 904 upon the base 902.

Thereafter, the worker 204 charges the pneumatic blower with radiant barrier material 906. The radiant barrier material 906, as described previously, is formed, e.g., of segregable pieces of reflective material. The radiant barrier material 906 comprises, for instance, processed pieces of radiant barrier material. The charging of the blower with the radiant barrier material and appropriate positioning by the worker 206 of the distal end 236 of the flexible hose 234 permits metering of the material 906 such that a radiant barrier layer 910 is formed on top of the thermal insulation layer 908. The illustration of FIG. 9 illustrates the pneumatic metering of the radiant barrier material 906 to form the layer 910.

Because the same pneumatic blower and workers are able to install the thermal barrier formed of both the thermal installation layer 908 and the radiant barrier layer 910, more efficient and speedy installation of the thermal barrier is provided in contrast to existing techniques and apparatus.

FIG. 10 illustrates an implementation, shown generally at 1000, of an implementation of an embodiment of the present disclosure in which the pneumatic blower 202 is positioned at a truck bed of a truck 1002. By such positioning, the pneumatic blower is provided with mobility together with movement of the truck 1002. Here, the truck 1002 is positioned proximate to a house 1004 having an attic 1006 at which a thermal barrier, formed of both a thermal installation layer 908 and a radiant barrier 910 is installed upon a base 902. In the illustration of FIG. 10, the truck 1002 is positioned, here in proximity to a garage 1002 to be positioned to permit flexible hose 234 to extend from the pneumatic blower 202 into the attic 1006 at which the worker 206 controls the installation of the layers 908 and 910 of the thermal barrier. The flexible hose here extends through an entry point 1008 directly into the attic 1006, and the attic 1006 also contains an entry point 1010 to permit entry of the worker 206 into the attic. In the other implementations, the pneumatic blower 202 is positioned elsewhere, such as on the ground, proximate to the house 1004, or in the garage 1012.

When so-positioned, the worker 204 charges material 904 and 906, as described previously, into the pneumatic blower 202, and the worker 206 directs installation of the layers 908 and 9010 upon the base 902. The same pneumatic blower 202 is used in the application of both of the layers 908 and 910.

Footsteps 1014 are also shown in the FIG., formed as the worker 206 walks through the attic 1006. The footsteps 1014 are, more generally, representative of any imperfection that compromises a thermal insulation layer, either a pre-existing thermal insulation layer or a newly-applied thermal insulation layer 908. The footsteps 1014 are caused by movement of the work 206 subsequent to entry at the entry point 1010. The barrier of thermal insulation layer 908 is compromised due to the work 206 being tasked to apply a thermal barrier formed of the layer 908 and 910 from points distant from the point of attic entry 101 and then back to the entry 101. As the pneumatic blower is capable of applying both the materials 904 and 906, the work 206 is able to provide instructions, as described previously, to instruct the work 204 to empty the blower 202 of the material 906 and to load thermal insulation 904 into the pneumatic blower. The pneumatic blower is then restarted, and the work 206 repairs the compromised thermal insulation layer 908 prior to final application of the radiant barrier layer 910. Radio communication, as described previously, provides for these operations to be carried out quickly and conveniently, as many times as is required to complete the installation of the radiant barrier.

In cases in which there is only one worker, it would be easy for that worker to do what needs to be done to apply both thermal insulation 904 and radiant barrier material 906 properly. In cases in which there are two workers 204, 206, those two workers 204, 206 may not be able to communicate by directly speaking to each other.

In such cases, there may either a wired or wireless communication system between the workers 204, 206. For example, worker 206 could want worker 204 to turn the blower off, to turn the blower on, to put thermal insulation in the blower, or to put radiant barrier material in the blower. A wireless communication system (shown in FIG. 9) could comprise walkie-talkies or cellular phones or similar devices with one such device 912 (associated with worker 204) and another such device 914 (associated with worker 206). Using such devices 912, 914 workers 204, 206 can communicate via wirelessly communicated words or some other understood code (of clicks, for example—one click for radiant barrier material; two clicks for thermal insulation; three clicks to turn the blower off; and four clicks to turn the blower on).

Yet another wireless option would be for device 914 to communicate with a remote control 916 such as the remote control manufactured by Meyer & Sons, Inc., of Libertyville, Ill., and shown in its catalog number 262-B-002. Remote 916 is shown in FIG. 9 to have a series of lights or other indicia 918 that enable worker 206 to tell worker 204 which of a number of options are desired. Remote 916 is also shown connected via a wire 920 to a control panel 922 (best seen in FIG. 10) on blower 202, so that worker 206 can control the blower 202 (e.g., turn it on and off) if desired.

A wired communication system is also shown in FIG. 10. In FIG. 10, a wire 1016 runs together with the flexible hose 234 so as to allow worker 206 to communicate with worker 204 in the truck and/or to control the pneumatic equipment via control panel 922. The flexible hose 234 with associated communication wire is shown to extend from truck mounted pneumatic equipment 202 to the attic 1006 of the house 1004 through the access port 1008 to the attic 1006. In the attic 1006 worker 206, who gained access the attic 1006 via the attic entry 1010, manipulates the distal end 236 of the flexible hose 234. There could be a small control at the distal end of the flexible hose 234 to enable worker 206 to provide control inputs to the communication and control system.

The method of the present invention and products thereof offer a number of advantages over the prior art. One particular advantage provided by embodiments of the method to add a radiant barrier to existing insulation is that extensive time and labor is not required for installation. A particular advantage provided by embodiments of the product of the present invention is that it is not combustible—that is, no element contained within the metered material is combustible. Another particular advantage provided by embodiments of the product of the present invention is that its reflective properties do not degrade over time due to dust settling on the flat surface and dulling its reflectivity. Because the metered material settles in on angles, any dust on its surface does not effectively reduce its reflectivity. Another particular advantage provided by embodiments of the product of the present invention is that one does not need to remove it to enter the attic space or to conduct repairs of any of the various mechanical and electrical systems typically contained in attic spaces, nor does one need to reattach it upon exit.

Because the same pneumatic blower and workers are able to install the thermal barrier formed of both the thermal installation layer 908 and the radiant barrier layer 910, more efficient and speedy installation of the thermal barrier is provided in contrast to existing techniques and apparatus.

Those of skill will appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for installing a thermal barrier upon a surface, said method comprising:
   collecting processed pieces of thermal insulation material;
   charging a single pneumatic blower with the processed pieces of thermal insulation material;
   pneumatically metering the processed pieces of the thermal insulation material to form a thermal insulation layer upon the surface;
   collecting processed pieces of radiant barrier material; thereafter
   charging the single pneumatic blower with the processed pieces of radiant barrier material; and
   pneumatically metering the processed pieces of the radiant barrier material to form a radiant barrier layer upon the thermal insulation layer;
   wherein the surface is divided into at least a first area and a second area, and;
   wherein the pneumatically metering the processed pieces of the thermal insulation material to form a thermal insulation layer upon the surface is first performed on the first area of the surface;
   wherein the pneumatically metering the processed pieces of the radiant barrier material to form a radiant barrier layer is performed on the first area after the thermal insulation is metered on the first area of the surface; and the method further comprising:
   charging the single pneumatic blower a second time with additional processed pieces of thermal insulation material;
   pneumatically metering the additional processed pieces of the thermal insulation material to form a thermal insulation layer upon the second area of the surface;
   thereafter charging the single pneumatic blower a second time with additional processed pieces of radiant barrier material; and
   pneumatically metering the additional processed pieces of the radiant barrier material to form a radiant barrier layer in the second area of the surface after the thermal insulation is metered on the second area of the surface.

2. The method of claim 1, wherein the processed pieces of radiant barrier material comprise low emissivity (low-e) material.

3. The method of claim 2, wherein the processed pieces of radiant barrier material comprise bits of aluminum foil.

4. The method of claim 1, wherein said method for installing a thermal barrier upon a surface is to be practiced by two workers.

5. The method of claim 4, further comprising employing wireless communication between the two workers.

6. The method of claim 4, further comprising employing wired communication between the two workers.

7. The method of claim 1, wherein said method is to be practiced by at least two remote workers, a first worker positioned so as to be able to charge the pneumatic blower and a second worker positioned so as to be able to pneumatically meter the thermal insulation material and radiant barrier material upon the surface, the surface being remote from the blower such that the first and second workers may not effectively communicate via unassisted speaking, wherein the first and second workers are in wired or wireless electrical communication using an electrical communication system, the method further comprising:
   the second worker to repeatedly provide instructions to the first worker via the electrical communication system when to switch from charging the blower with thermal insulation material to charging the blower with radiant barrier material and vice versa.

8. The method of claim 1, wherein said method is to be practiced by at least two remote workers, a first worker positioned so as to be able to charge the pneumatic blower and a second worker positioned so as to be able to pneumatically meter the thermal insulation material and radiant barrier material upon the surface, the surface being remote from the blower such that the first and second workers may not effectively communicate via unassisted speaking, wherein the first and second workers are in wired or wireless electrical communication using an electrical communication system, the method further comprising:
   the second worker to repeatedly provide instructions to the first worker via the electrical communication system when to switch from charging the blower with thermal insulation material to charging the blower with radiant barrier material and vice versa.

9. A method to apply thermal barrier to a substrate, said method comprising:
   applying thermal insulation charged in a single pneumatic blower to the substrate;
   thereafter
   collecting a radiant barrier material, which reflects more than the thermal insulation, in the single pneumatic blower; and
   applying the radiant barrier material to the top of the applied thermal insulation with blown air;
   wherein during the applying thermal insulation charged in the single pneumatic blower to the substrate, the thermal insulation is first applied to a first area of the substrate; and
   wherein during the applying the radiant barrier material to the top of the thermal insulation with blown air, the radiant barrier material is applied to the first area of the substrate; and further comprising thereafter:
   applying additional thermal insulation charged in the single pneumatic blower to a second area of the substrate;
   thereafter applying additional radiant barrier material to the top of the thermal insulation with blown air on the second area of the substrate using the single pneumatic blower.

10. The method of claim 9, wherein the radiant barrier material that reflects more than the thermal insulation also emits less than the thermal insulation.

11. The method of claim 10, wherein the radiant barrier material that emits less and reflects more than the thermal insulation comprises aluminum foil.

12. The method of claim 11, wherein the aluminum foil comprises loose bits and pieces of aluminum foil.

13. The method of claim 9, wherein said method is to be practiced by at least two remote workers, a first worker positioned so as to be able to charge the pneumatic blower and a second worker positioned so as to be able to pneumatically meter the thermal insulation material and radiant barrier material upon the substrate, the substrate being remote from the blower such that the first and second workers may not effectively communicate via unassisted speaking, wherein the first and second workers are in wired or wireless electrical communication using an electrical communication system, the method further comprising:
   the second worker to repeatedly provide instructions to the first worker via the electrical communication system when to switch from charging the blower with thermal insulation material to charging the blower with radiant barrier material and vice versa.

14. A method for installing a thermal barrier upon a surface wherein the surface is divided into at least a first area and a second area, said method comprising:
charging a single pneumatic blower a first time with pieces of thermal insulation material;
pneumatically metering a first set of pieces of the thermal insulation material charged in the single pneumatic blower the first time to form a thermal insulation layer upon the first area of the surface;
thereafter
charging the single pneumatic blower a second time with pieces of radiant barrier material; and
pneumatically metering a first set of pieces of the radiant barrier material charged in the single pneumatic blower the second time to form a radiant barrier layer upon the thermal insulation layer formed upon the first area of the surface;
charging the single pneumatic blower a third time with pieces of thermal insulation material;
pneumatically metering a second set of pieces of the thermal insulation material charged in the single pneumatic blower the third time to form a thermal insulation layer upon the second area of the surface;
thereafter charging the single pneumatic blower a fourth time with pieces of radiant barrier material; and
pneumatically metering a second time a second set of pieces of the radiant barrier material charged in the single pneumatic blower the fourth time to form a radiant barrier layer in the second area of the surface after the thermal insulation material has been metered on the second area.

15. The method of claim 14, wherein the radiant barrier material comprises low emissivity (low-e) material.

16. The method of claim 15, wherein the low-e material comprises foil material.

17. The method of claim 16, wherein the foil material comprises aluminum foil.

18. The method of claim 14, wherein the act of pneumatically metering the thermal insulation material upon the surface to form a thermal insulation layer is performed for repair of compromised thermal insulation.

19. The method of claim 14, wherein the charging acts are to be performed by a first worker and the pneumatically metering acts are to be performed by a second worker.

20. The method of claim 19, further comprising employing a wireless communication system between the first and second workers.

21. The method of claim 19, further comprising employing wired communication between the first and second workers.

22. The method of claim 14, wherein said method is to be practiced by at least two remote workers, a first worker positioned so as to be able to charge the pneumatic blower and a second worker positioned so as to be able to pneumatically meter the thermal insulation material and radiant barrier material upon the surface, the surface being remote from the blower such that the first and second workers may not effectively communicate via unassisted speaking, wherein the first and second workers are in wired or wireless electrical communication using an electrical communication system, the method further comprising:
the second worker to repeatedly provide instructions to the first worker via the electrical communication system when to switch from charging the blower with thermal insulation material to charging the blower with radiant barrier material and vice versa.

23. A method for installing a thermal barrier upon a surface, said method comprising:
collecting processed pieces of thermal insulation material;
charging a single pneumatic blower with the processed pieces of thermal insulation material;
pneumatically metering the processed pieces of the thermal insulation material to form a thermal insulation layer upon the surface;
collecting processed pieces of radiant barrier material; thereafter
charging the single pneumatic blower with the processed pieces of radiant barrier material; and
pneumatically metering the processed pieces of the radiant barrier material to form a radiant barrier layer upon the thermal insulation layer;
wherein the surface to which the thermal insulation layer and radiant barrier layer are to be formed is of a size that a worker could not cause a thermal insulation layer to be formed on the entire surface without walking upon a portion of the surface after a layer of thermal insulation has been metered onto the surface in order to meter out a layer of radiant barrier, wherein the surface is divided into at least a first area and a second area, and;
wherein the pneumatically metering the processed pieces of the thermal insulation material to form a thermal insulation layer upon the surface is first performed on the first area of the surface;
wherein the pneumatically metering the processed pieces of the radiant barrier material to form a radiant barrier layer is performed on the first area after the thermal insulation is metered on the first area of the surface; and the method further comprising:
charging the single pneumatic blower a second time with additional processed pieces of thermal insulation material;
pneumatically metering the additional processed pieces of the thermal insulation material to form a thermal insulation layer upon the second area of the surface;
thereafter charging the single pneumatic blower a second time with additional processed pieces of radiant barrier material; and
pneumatically metering the additional processed pieces of the radiant barrier material to form a radiant barrier layer in the second area of the surface after the thermal insulation is metered on the second area of the surface.

24. A method for installing a thermal barrier upon a surface, said method comprising:
charging a single pneumatic blower a first time with pieces of thermal insulation material;
pneumatically metering a first set of pieces of the thermal insulation material charged in the single pneumatic blower the first time to form a thermal insulation layer upon a first area of the surface;
thereafter
charging the single pneumatic blower a second time with pieces of radiant barrier material; and
pneumatically metering a first set of pieces of the radiant barrier material charged in the single pneumatic blower the second time to form a radiant barrier layer upon the thermal insulation layer formed upon the first area of the surface;
thereafter charging the single pneumatic blower a third time with pieces of thermal insulation material;

pneumatically metering a second set of pieces of the thermal insulation material charged in the single pneumatic blower the third time to form a thermal insulation layer upon a second area of the surface;

thereafter charging the single pneumatic blower a fourth time with pieces of radiant barrier material; and pneumatically metering a second set of pieces of the radiant barrier material charged in the single pneumatic blower the fourth time to form a radiant barrier layer upon the thermal insulation layer formed upon the second area of the surface.

\* \* \* \* \*